(12) United States Patent
Brouillette

(10) Patent No.: US 6,739,011 B1
(45) Date of Patent: May 25, 2004

(54) VERTICALLY MOVABLE DOCK BUMPER DEVICE

(75) Inventor: Thomas J. Brouillette, Orland, ME (US)

(73) Assignee: Industrial Dock Equipment, LLC, Orland, ME (US)

( * ) Notice: Subject to any disclaimer, the term of this patent is extended or adjusted under 35 U.S.C. 154(b) by 0 days.

(21) Appl. No.: 10/382,509

(22) Filed: Mar. 7, 2003

(51) Int. Cl.$^7$ .................................................. E01D 1/00
(52) U.S. Cl. ..................... 14/71.1; 14/69.5; 293/123; 293/124
(58) Field of Search ................. 14/69.5, 71.1; 293/102, 123, 124, 140; 405/212

(56) References Cited

U.S. PATENT DOCUMENTS

| | | | | | |
|---|---|---|---|---|---|
| 2,420,677 | A | * | 5/1947 | Peterson | 405/212 |
| 2,489,869 | A | * | 11/1949 | Dunn | 414/584 |
| 4,127,856 | A | * | 11/1978 | Bickel | 340/687 |
| 4,900,192 | A | * | 2/1990 | Wood | 405/215 |
| 4,910,280 | A | * | 3/1990 | Robbins, III | 428/71 |
| 5,570,918 | A | * | 11/1996 | Lively | 293/132 |
| 5,762,016 | A | * | 6/1998 | Parsons | 114/219 |
| 6,497,076 | B1 | * | 12/2002 | van de Wiel et al. | 52/173.2 |
| 6,634,049 | B2 | * | 10/2003 | Hahn et al. | 14/71.1 |

\* cited by examiner

*Primary Examiner*—Gary S Hartmann
(74) *Attorney, Agent, or Firm*—Anthony D. Pellegrini, Esq.

(57) ABSTRACT

A vertically movable loading dock bumper device to be attached to a loading dock and interposed between the loading dock and a vehicle during the loading/unloading process, in which the vertical movement of the bumper is in concert with the vertical movement of the vehicle as the vehicle moves vertically during the loading/unloading process. The dock bumper device consists of a mount component, a bumper component, and a slide component, whereby the mount component is fixedly attached to a loading dock, the bumper component accommodates a bumper, and the slide component connects the bumper component to the mount component in a manner permitting the bumper component to move along the mount component in a vertical direction.

10 Claims, 6 Drawing Sheets

VERTICALLY MOVABLE DOCK BUMPER DEVICE

TECHNICAL FIELD

The invention claimed herein relates generally to loading dock bumper devices used to protect loading docks and/or vehicles from damage resulting during the loading/unloading process and, more particularly, to a vertically movable loading dock bumper device.

BACKGROUND

Loading dock bumper devices are well known in the art. They are used to protect loading docks and vehicles from damage resulting from the vehicles contacting the loading dock during loading and/or unloading activity. Damage to the loading dock and/or the vehicle would otherwise occur because a typical loading/unloading activity is initiated by the vehicle backing towards the loading dock until the rear of the vehicle is very close to the loading dock. Because too great a gap between the vehicle and the loading dock would make loading/unloading difficult, drivers typically err on the side of bringing the vehicle too close to the loading dock, often resulting in contact therewith. Having a loading dock bumper disposed between the vehicle and the loading dock allows the vehicle to back towards the loading dock without fear of contact, as the dock bumper disperses the force of a low speed contact without damage to either the vehicle or the loading dock.

Most loading dock bumper devices are immovably fixed to loading docks. Swessel, et al., U.S. Pat. No. 4,744,121 (May 17, 1988), discloses such immovably fixed dock bumpers. Other configurations use dock bumpers which are affixed to moveable portions of the loading dock, but in such configurations the bumper is essentially immovable once the loading dock has been correctly positioned for the specific vehicle and loading/unloading begins. Hahn, U.S. Pat. No. 6,360,394 (Mar. 26, 2002) discloses dock bumpers fixedly attached to a movable dock leveler, and van de Wiel, et al., U.S. Pat. No. 6,497,076 (Dec. 24, 2002) discloses a bumper affixed to a device which moves between an operative position and a stored position. However, in both these devices once the dock bumper is positioned for the loading/unloading activity, it remains in that position and effectively becomes an immovable bumper for the duration of the activity.

The disadvantage of such devices is evident from observations of their use with vehicles employing air suspension technology. The cargo box or trailer of a vehicle so equipped moves vertically on its air suspension mechanism to accommodate different cargo weights. A lighter load causes the cargo box or trailer to ride higher, and a heavier load causes it to ride lower. During the loading/unloading process, however, the weight of the cargo necessarily changes. Moreover, machines that may be used in the loading/unloading process, such as forklifts, can substantially (if only temporarily) alter the weight of the vehicle when they are driven onto and off of the vehicle. As a result, during the loading/unloading process the vehicle is often caused to move vertically, often in both directions and often with many movements, corresponding to the changing weight within the cargo box or trailer.

When a vehicle is backed against a dock bumper, lateral forces continue to be exerted against the bumper by the vehicle as long as contact continues. When a vehicle having an air suspension mechanism moves vertically during the loading/unloading process, as described above, the lateral forces against the bumper (or even friction between the rear of the vehicle and the bumper) may be sufficient to overcome any slipping between the rear of the vehicle and the bumper, the bumper is physically moved along with the vehicle. When such movements exceed the deforming properties of the bumper, the bumper is either ripped, torn, or otherwise damaged, or detached from the loading dock, or both.

A dock bumper device which permits the dock bumper to move in concert with the rear of the vehicle during the loading/unloading process significantly reduces the damage that would occur to the dock bumper and/or the loading dock, as described above. As such, replacement, repair, and maintenance of the dock bumper is greatly reduced, at significant cost and time savings.

Examples of vertically movable dock bumpers are disclosed in the following references:

Drawing "Adjustable Bottom Pad (692-0029)"; dated Oct. 17, 1985 (showing a vertically adjustable pad mounted to the dock face);

Spec Sheet "Loading Systems Mobile Dock Bumper RB 250M"; dated circa 1993 (showing a vertically-adjustable spring-loaded dock bumper); and Drawing "Hohenbeweglicher Anfahrpuffer 5146.0102"; dated November 1995 (showing a vertically-adjustable, spring-loaded dock bumper).

While each of these references discloses a vertically movable dock bumper, the devices disclosed therein are of complicated and inferior design. As such, the cost of manufacture and/or installation of these devices would be high, as would be the likelihood of failure during operation. The invention claimed herein seeks to address these design flaws with its simple yet rugged design and utilization of a movement mechanism which reduces the potential for lateral binding present in the devices disclosed in the prior art, thereby resulting in a reduction of the deficiencies inherent in the prior art devices.

SUMMARY

In one aspect, the invention is directed to a loading dock bumper device adapted to allow for the vertical movement of a bumper. This aspect may include one or more of the following features:

a mount component, a bumper component, and a slide component, whereby the mount component is suitably adapted to fixedly attach to a loading dock, the bumper component is suitably adapted to accommodate a bumper, and the slide component is suitably adapted to connect the bumper component to the mount component in a manner permitting the bumper component to move along the mount component in a vertical direction in concert with the vertical movement of a vehicle; the mount component may be constructed of channel iron having a substantially flat back panel and two lateral flanges, a top plate constructed of sheet steel or bar stock, and an attachment plate constructed of angle iron; the bumper component may be constructed of channel iron having a substantially flat front panel and two flanges oriented along the top and bottom, with the bumper component suitably adapted to fit within the flanges of the mounting component and against the inner surface thereof, and suitably adapted to carry a bumper on its outer surface; and the slide component may be constructed of a pair of steel rods with a pair of springs disposed thereon, with the pair of rods disposed through apertures formed into the mount component and the bumper component such that the rods are fixedly attached to the mount component and retain the bumper component within the mount component, and the springs support the bumper component and facilitate its movement in a vertical direction.

Other features and advantages of the invention are described below.

DETAILED DESCRIPTION

Figure 1:
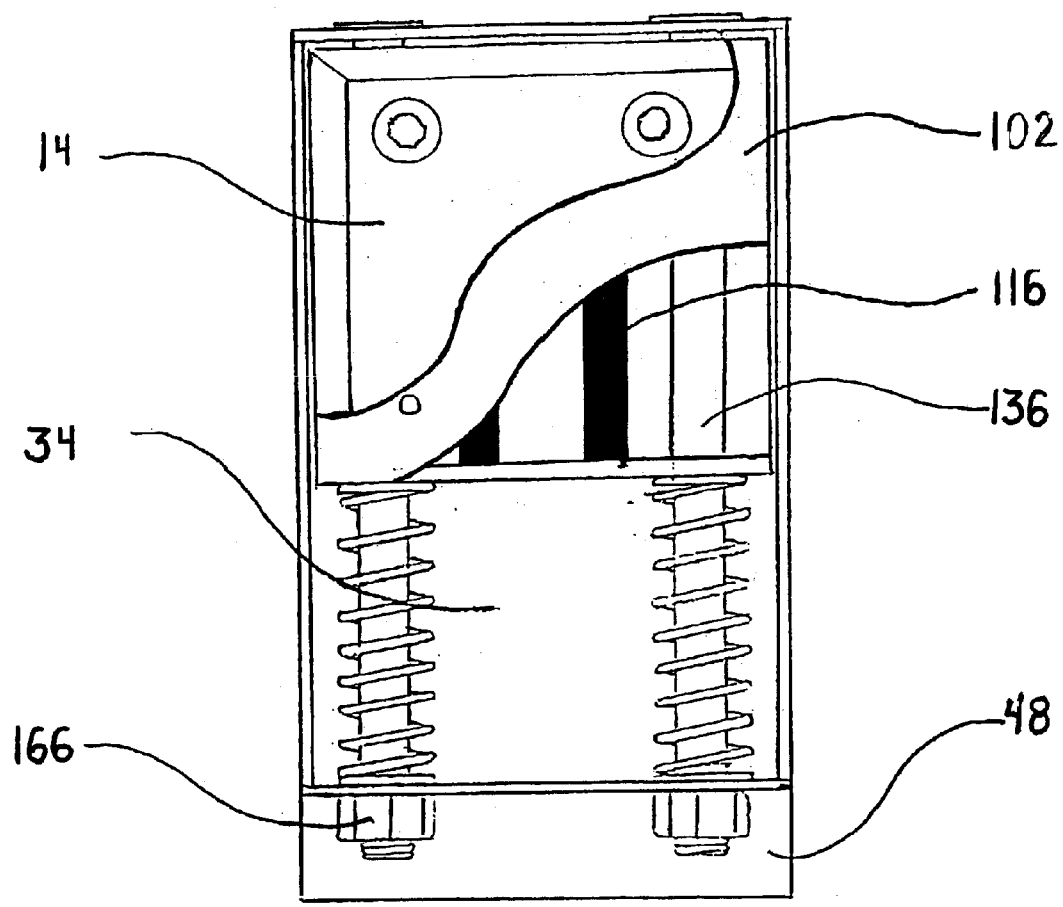
FIG. 1 is a front cut-away view of the dock bumper device.
Figure 3:
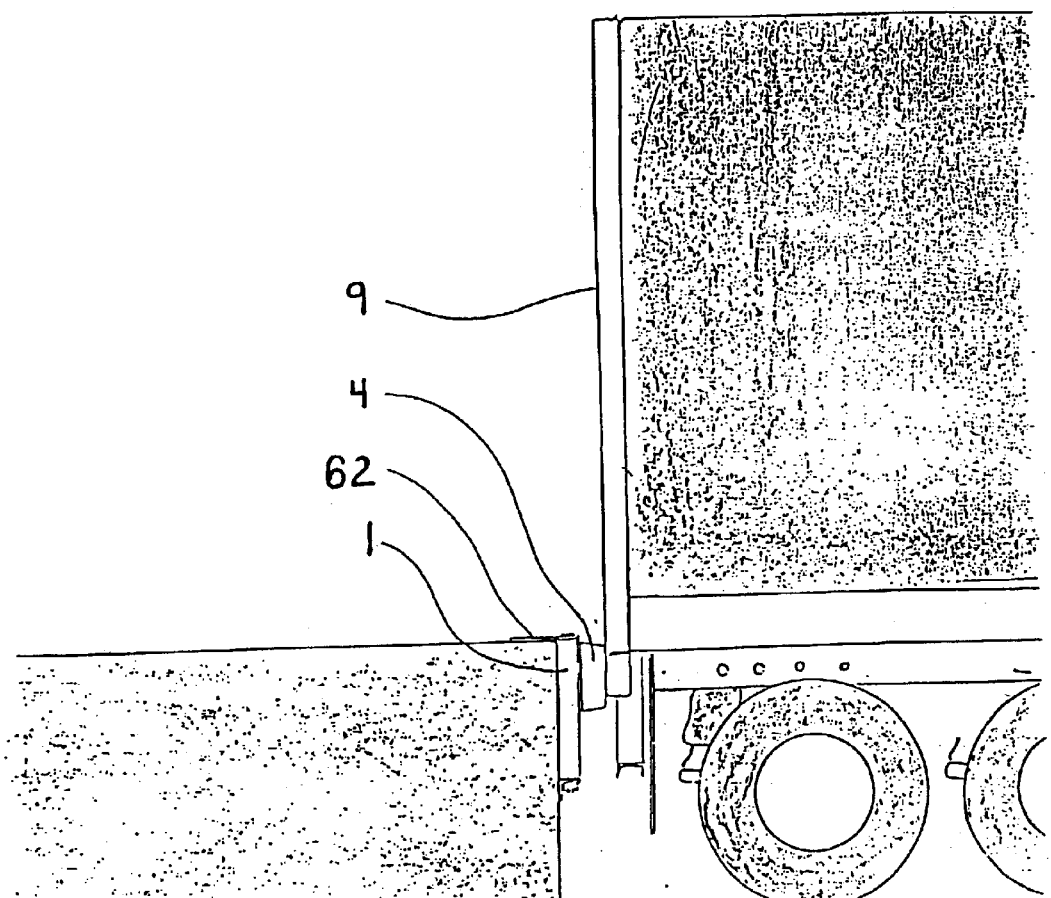
FIG. 3 is a side view of the dock bumper device installed for use on a loading dock, with a vehicle backed against it.

FIG. 1 shows a front cut-away view of one embodiment of the claimed inventive device, a vertically movable dock bumper 1. The dock bumper 1 is intended to be affixed to a loading dock 8 in a manner such that the bumper component 4 of the dock bumper 1 is positioned between the loading dock 8 and a vehicle 9, such as a truck, which uses the loading dock 8 to load and/or unload goods, for the purpose of protecting both the loading dock 8 and the vehicle 9 from damage in the event of contact between the vehicle 9 and the loading dock 8. (FIG. 3 depicts the relationship of the dock bumper 1, the loading dock 8, and a vehicle 9.) Moreover, the dock bumper 1 is adapted to allow the bumper component 4 to move in a vertical direction in concert with any vertical motion of the loading/unloading vehicle 9 in contact therewith, thereby effectively providing protection to both the loading dock 8 and the vehicle 9 while addressing the problem of potential damage to the bumper component 4 caused by the vertical movement of the vehicle 9.

Figure 5:
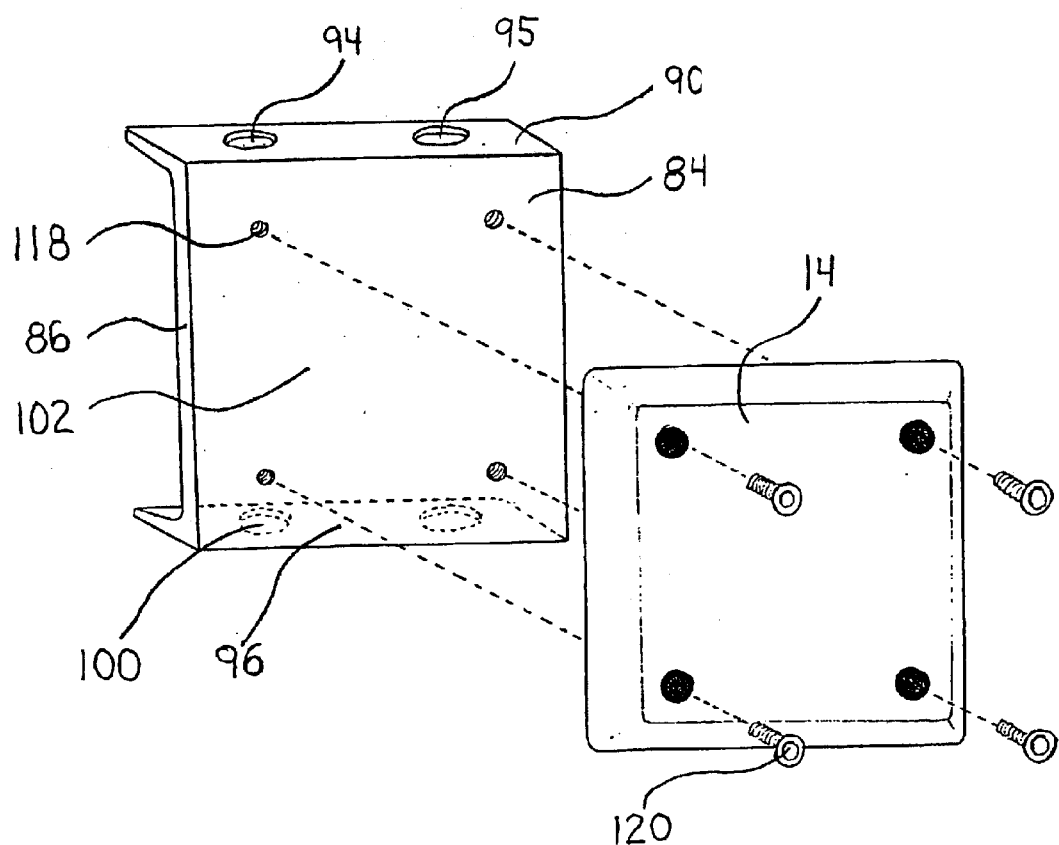
FIG. 5 is a perspective, exploded view of the bumper component of the dock bumper device, with its two subcomponents depicted separately for clarity of detail, and with dotted lines depicting the relationship of the subcomponents to each other.
Figure 6:
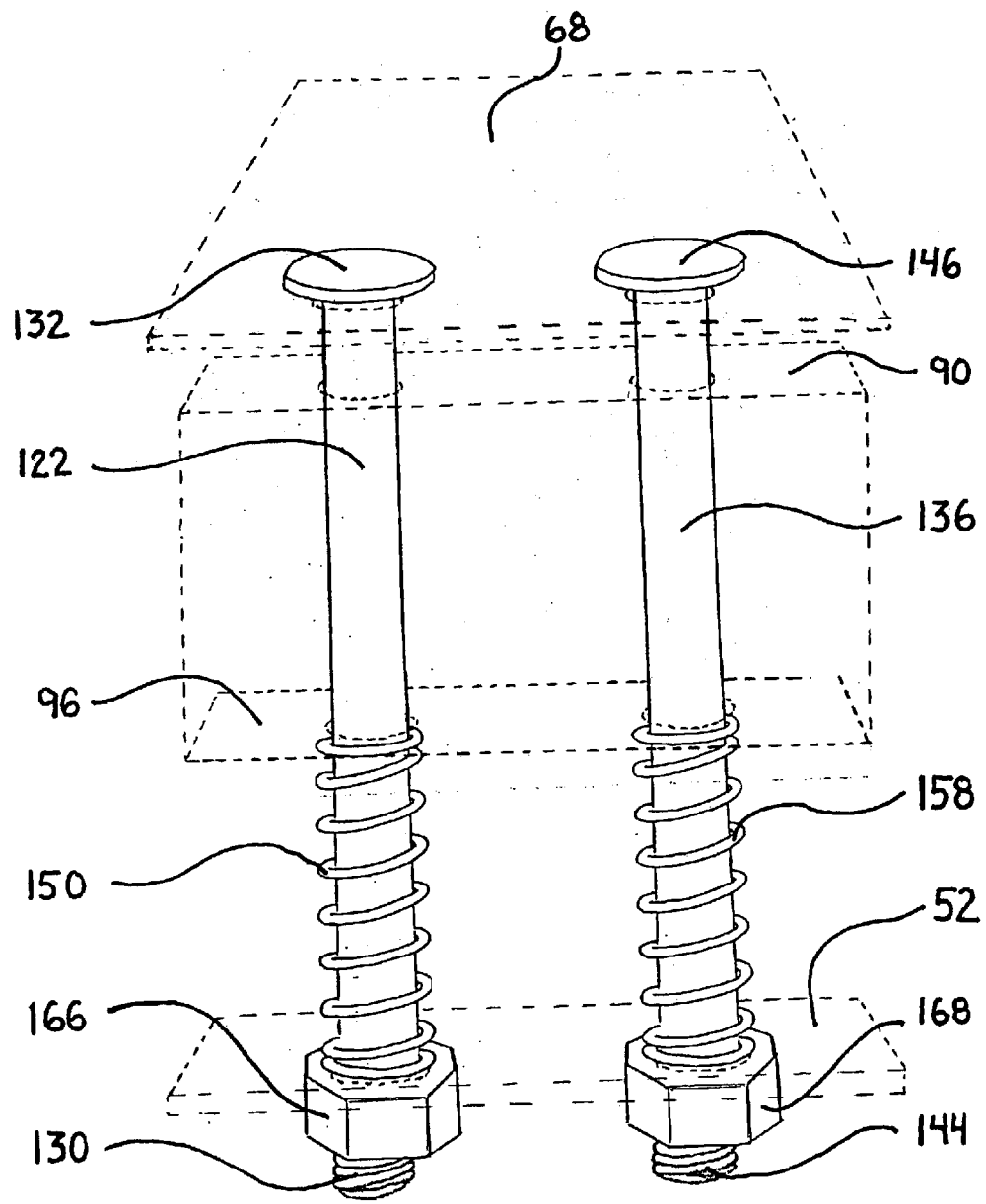
FIG. 6 is a front view of the slide component of the dock bumper device, with ghost lines depicting the relationship of the mount component and the bumper component to the slide component.

The dock bumper 1 includes three primary components: a mount component 2 (shown in detail in FIG. 4), a bumper component 4 (shown in detail in FIG. 5), and a slide component 6 (shown in detail in FIG. 6). The mount component 2 is suitably adapted to be fixedly attached to a loading dock 8. The bumper component 4 is suitably adapted to accommodate a bumper 14. The slide component 6 is suitably adapted to connect the bumper component 4 to the mount component 2, in a manner permitting the bumper component 4 to move along the mount component 2 in a vertical direction.

Figure 2:
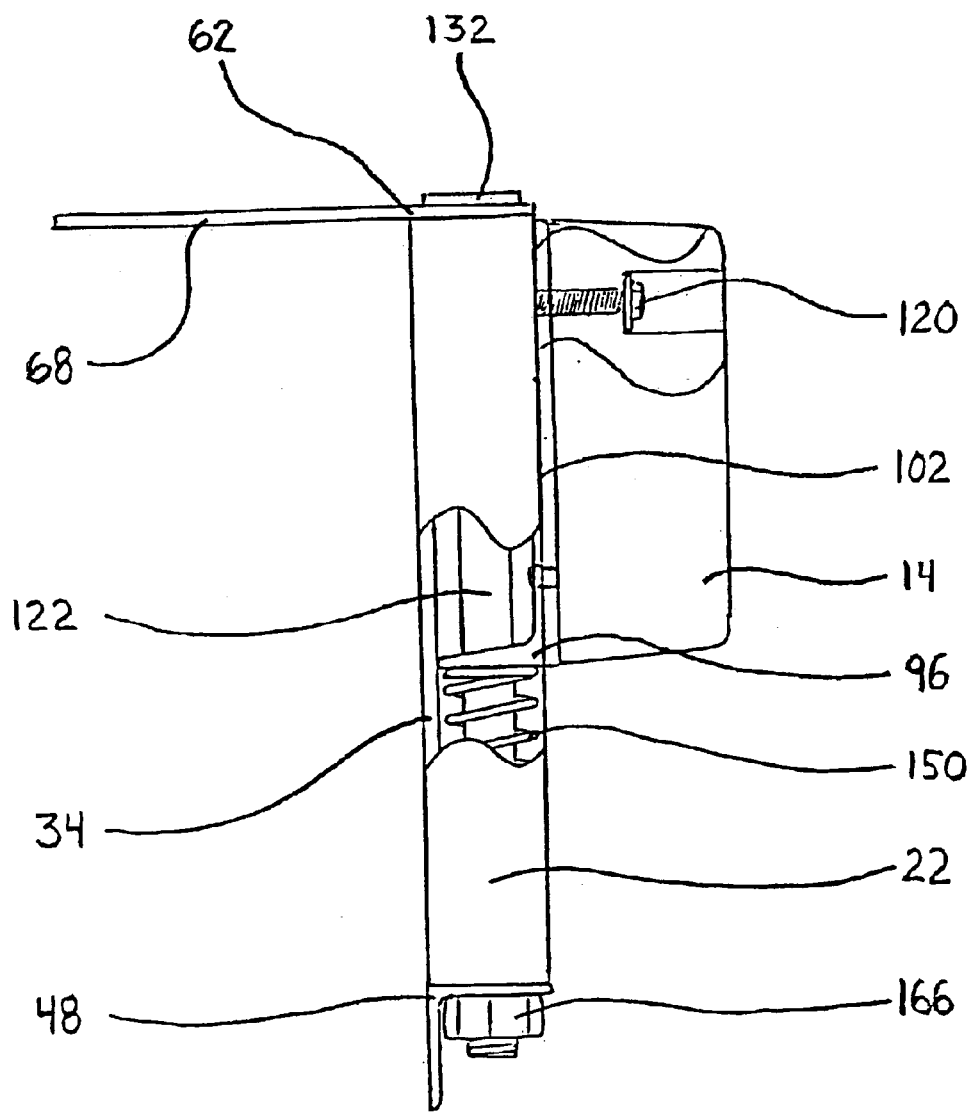
FIG. 2 is a side cut-away view of the dock bumper device.
Figure 4:
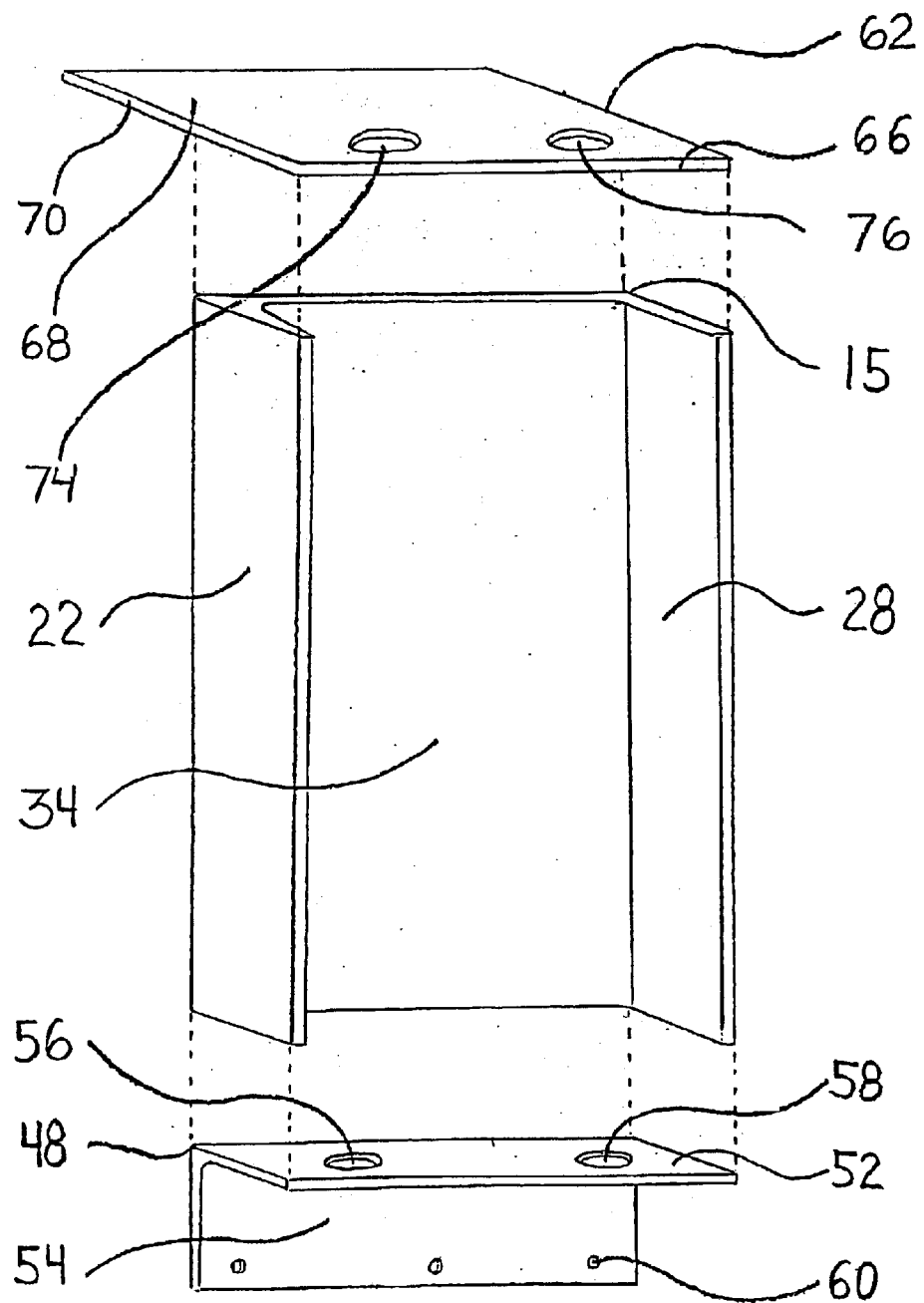
FIG. 4 is a perspective, exploded view of the mount component of the dock bumper device, with its three subcomponents depicted separately for clarity of detail, and with dotted lines depicting the relationship of the subcomponents to each other.

FIG. 2 shows a side view of the mount component 2. The mount component 2 is comprised of three subcomponents: a back plate 15, an attachment plate 48, and a top plate 62. FIG. 4 is an exploded perspective view of the mount component showing these three subcomponents. These three subcomponents are fixedly attached to each other and are all constructed of a rigid metal, such as steel or iron. In one embodiment, the back plate 15 is constructed of channel iron, the attachment plate 48 is constructed of angle iron, and the top plate 62 is constructed of plate steel. In another embodiment the top plate 62 may be constructed of steel bar stock.

The back plate 15 is comprised of a back panel 34, a first side flange 22, and a second side flange 28, and has a top edge 18 and a bottom edge 20.

The back panel 34 is substantially flat and substantially rectangular in shape, with a width 36 less than its height 38. The first side 40 of the back panel 34 and the second side 42 of the back panel 34 are opposite and lateral when the back panel 34 is in its intended vertical orientation. Extending from the first side 40 of the back panel 34 is the first side flange 22, and extending from the second side 42 of the back panel 34 is the second side flange 28. Both the first side flange 22 and the second side flange 28 extend in the same direction from the plane of the back panel 34 and are both oriented substantially perpendicular to the back panel 34 and are parallel to each other. The surface of the back panel 34 on the same side as the first side flange 22 and the second side flange 28 is designated the front surface 44 of the back panel 34; the opposite surface is designated the back surface 46 of the back panel 34.

The first side flange 22 is substantially rectangular, with a length 24 substantially the same as the height 38 of the back panel 34 and a width 26 substantially less than the length 24 of the first side flange 22. The second side flange 28 is substantially the same size and shape as the first side flange 22. The first side flange 22, the second side flange 28, and the back panel 34 are integrated as a single piece of metal forming the "u" shape common to channel iron.

In one preferred embodiment, the back panel 34 is between eight inches and sixteen inches in width 36 and between sixteen inches and twenty-four inches in height 38, and has a thickness of between one-eighth inch and one-half inch; the first side flange 22 and the second side flange 28 are each between two and three inches in width 26,32 and have substantially the same length 24,30 and thickness as the back panel 34. In the most preferred embodiment, the back panel 34 is twelve inches in width 36 and eighteen inches in height 38, and has a thickness of one-quarter inch; the first side flange 22 and the second side flange 28 are each two and one-half inches in width 26,32 and have the same length 24,30 and thickness as the back panel 34.

The attachment plate 48 is comprised of a top flange 52 and a back flange 54. The top flange 52 and the back flange 54 are both substantially rectangular in shape and substantially equivalent in dimension, and are positioned adjacent to each other along one of the long sides of each of the flanges 52,54, thereby forming an angle. The top flange 52 and the back flange 54 are oriented substantially perpendicular to each other. The top flange 52 and the back flange 54 are integrated as a single piece of metal forming the shape common to angle iron. The attachment plate 48 has a length 50 substantially the same as the width 16 of the back plate 15. In the preferred embodiment, the top flange 52 has a width 53 substantially the same as the width 26 of the first side flange 22, and the back flange 54 has a width 55 between two and three inches, with both flanges having a thickness substantially the same as the thickness of the back panel 34.

The top plate 62 is substantially flat and substantially rectangular in shape, with a width 64 substantially the same as the width 16 of the back plate 15. In the preferred embodiment, the top plate 62 is between twelve inches and sixteen inches in length 65, and has a thickness of between one-eighth inch and one-half inch, with a most preferred thickness of one-quarter inch.

The three subcomponents of the mount component 2 are fixedly, attached to each other as follows: The top flange 52 of the attachment plate 48 is fixedly attached to the bottom edge 20 of the back plate 15 and to the bottoms of the first side flange 22 and the second side flange 28. A preferred manner of attachment is by welding. The top flange 52 is oriented substantially perpendicular to the back panel 34 and oriented such that it extends forward from the front surface 44 of the back panel 34 in the same direction as the first side flange 22 and the second side flange 28, resulting in the back flange 54 of the attachment plate 48 being oriented substantially coplanar with the back panel 34. The top plate 62 is fixedly attached to the top edge 18 of the back plate 15 and to the tops of the first side flange 22 and the second side flange 28. A preferred manner of attachment is by welding. The top plate 62 is oriented such that the first edge 70 of the top plate 62 is aligned flush with the first side flange 22 and the second edge 72 of the top plate 62 is aligned flush with the second side flange 28. The front edge 66 of the top plate 62 extends from the front surface 44 of the back panel 34 in the same direction as the first side flange 22 and the second side flange 28 in an amount substantially equal to the width 26 of the first side flange 22, with the remaining portion of the top panel extending rearward from the back surface 46 of the back panel 34, forming a lip 68. The top plate 62 is oriented substantially perpendicular to the back panel 34. The result is that the mount component 2 is configured as a five sided shallow container opened at the front, with the top side 108 extending rearward (the top plate lip 68) and the back side extending downward (the back flange 54 of the attachment plate 48) beyond the sides of the container.

FIG. 5 shows an exploded perspective view of the bumper component 4. The bumper component 4 is comprised of two subcomponents: a front plate 84 and a bumper 14. The front plate 84 is constructed of a rigid metal, such as steel or iron. In one embodiment, the front plate 84 is constructed of channel iron. The bumper 14 is a standard bumper known in the art and characterized by the quality of being able to receive and dissipate a force from an object striking the bumper 14, such as a vehicle 9. In one embodiment the bumper 14 is constructed of rubber. The bumper 14 is fixedly attached to the front plate 84.

The front plate 84 is comprised of a front panel 102, an upper flange 90, and a lower flange 96, and has a first edge 86 and a second edge 88.

The front panel 102 is substantially flat and substantially rectangular in shape, with a width 104 less than the width 36 of the back panel 34 and a height 106 less than the height 17 of the back plate 15. The top side 108 of the front panel 102 and the bottom side 110 of the front panel 102 are located opposite each other. The intended orientation of the front panel 102 is vertical. Extending from the top side 108 of the front panel 102 is the upper flange 90, and extending from the bottom side 110 of the front panel 102 is the lower flange 96. Both the upper flange 90 and the lower flange 96 extend in the same direction from the plane of the front panel 102 and are both oriented substantially perpendicular to the front panel 102 and are parallel to each other. The surface of the front panel 102 on the same side as the upper flange 90 and the lower flange 96 is designated the back surface 114 of the front panel 102; the opposite surface is designated the front surface 112 of the front panel 102.

The upper flange 90 is substantially rectangular, with a length 92 substantially the same as the width 104 of the front panel 102 and a width 93 substantially less than the length 92 of the upper flange 90. The lower flange 96 is substantially the same shape and size as the upper flange 90. The upper flange 90, the lower flange 96, and the front panel 102 of the front plate 84 are integrated as a single piece of metal forming the "u" shape common to channel iron.

In one preferred embodiment, the front panel 102 is between eight inches and sixteen inches in width 104 and between eight inches and sixteen inches in height 106, and has a thickness of between one-quarter inch and three-quarter inch; the upper flange 90 and the lower flange 96 are each between two and three inches in width 93,99 and have substantially the same length 92,98 and thickness as the front panel 102. In the most preferred embodiment, the front panel 102 is slightly less than twelve inches in width 104 such that when positioned vertically within the cavity of the mount component 2 the front plate 84 fits between the first side flange 22 and the second side flange 28; and the front panel 102 is twelve inches in height 106 and has a thickness of one-half inch; the upper flange 90 of the front plate 84 and the lower flange 96 of the front plate 84 are each two and one-half inches in width 93,99 and have the same length 92,98 and thickness as the front panel 102. In this embodiment, one or more reinforcement bars 116 constructed of a rigid metal, preferably steel bar stock, are welded to the back surface 114 of the front panel 102, providing reinforcement to the front plate 84 and minimizing the instance of the front plate 84 buckling when the bumper 14 is contacted by a vehicle 9.

The bumper 14 is fixedly attached to the front surface 112 of the front panel 102.

In one embodiment, the front panel 102 further comprises a plurality of apertures 118 dispersed along the front panel 102 and suitably adapted to accommodate a plurality of fastening devices 120 suitably adapted to attach the bumper 14 to the front panel 102.

FIG. 6 shows a front view of the slide component 6. The slide component 6 is comprised of a first slide pin 122, a second slide pin 136, a first spring 150, and a second spring 158, and a first nut 166 and a second nut 168 to secure the slide component 6 to the mount component 2.

The first slide pin 122 is a rigid metal rod having a circular cross section and a uniform diameter 124. In one embodiment the first slide pin 122 is constructed of round stock steel. The length 126 of the first slide pin 122 is slightly greater than the height 17 of the back plate 15. The first slide pin 122 has a top end 128 and a threaded bottom end 130. Fixedly attached to the top end 128 of the first slide pin 122 is a first top cap 132. The first top cap 132 is a rigid, flat metal disk, being substantially circular, having a diameter 134 greater than the diameter 124 of the first slide pin 122. The first top cap 132 is oriented perpendicular to the top end 128 of the first slide pin 122.

The second slide pin 136 is a rigid metal rod having a circular cross section and a uniform diameter 138. In one embodiment the first slide pin 122 is constructed of round stock steel. The diameter 138 of the second slide pin 136 is substantially the same as the diameter 124 of the first slide pin 122 and the length 140 of the second slide pin 136 is substantially the same as the length 126 of the first slide pin 122. The second slide pin 136 has a top end 142 and a threaded bottom end 144. Fixedly attached to the top end 142 of the second slide pin 136 is a second top cap 146. The second top cap 146 is a rigid, flat metal disk, being substantially circular, having a diameter 148 greater than the diameter 138 of the second slide pin 136. The second top cap 146 is oriented perpendicular to the top end 142 of the second slide pin 136.

In one preferred embodiment, the first slide pin 122 has a length 126 of between seventeen inches and twenty-five inches, and a diameter 124 of between three-quarter inch and one and one-half inches, and the second slide pin 136 has substantially the same dimensions. In the most preferred embodiment, the first slide pin 122 has a length 126 of nineteen inches and a diameter 124 of one inch, and the second slide pin 136 has substantially the same dimensions.

The first spring 150 is constructed of a flexible metal and coiled such that it has a substantially uniform outside diameter 152 and a substantially uniform inside diameter 154. The inside diameter 154 of the first spring 150 is slightly greater than the diameter 124 of the first slide pin 122. The first spring 150 has a length 156 less than the length 126 of the first slide pin 122. The first spring 150 is suitably adapted to support the weight of the bumper component 4.

The second spring 158 is constructed of a flexible metal and coiled such that it has a substantially uniform outside diameter 160 and a substantially uniform inside diameter 162. The inside diameter 162 of the second spring 158 is slightly greater than the diameter 138 of the second slide pin 136. The second spring 158 has a length 164 less than the length 140 of the second slide pin 136 and substantially the same as the length 156 of the first spring 150. The second spring 158 is suitably adapted to support the weight of the bumper component 4. The first nut 166 is suitably adapted to be placed onto and secured to the threaded bottom end 130 of the first slide pin 122. The second nut 168 is suitably adapted to be placed onto and secured to the threaded bottom end 144 of the second slide pin 136.

The first and second slide pins 122,136 are positioned within apertures 56,58,74, 76,94,95,100,101 located in the mount component 2 and the bumper component 4. Formed into the top plate 62 of the mount component 2 are a first top plate apertures 74 and a second top plate aperture 76. Each of these apertures 74,76 are substantially circular. The first top plate aperture 74 has a diameter 75 just slightly larger than the diameter 124 of the first slide pin 122 and smaller than the diameter 134 of the first top cap 132. The second top, plate aperture 76 has a diameter 77 just slightly larger than the diameter 138 of the second slide pin 136 and smaller than the diameter 148 of the second top cap 146. The first top plate aperture 74 passes completely through the top plate 62 and is located proximate to the front edge 66 of the top plate 62 and proximate to the first side flange 22. The second top plate aperture 76 passes completely through the top plate 62 and is located proximate to the front edge 66 of the top plate 62 substantially the same distance from the front edge 66 of the top plate 62 as is the first top plate aperture 74 from the front edge 66 of the top plate 62, and is located proximate to the second side flange 28 substantially the same distance from the second side flange 28 as is the first top plate aperture 74 from the first side flange 22.

Formed into the top flange 52 of the attachment plate 48 are a first attachment plate aperture 56 and a second attachment plate aperture 58. The first attachment plate aperture 56 is substantially the same size and shape as the first top plate aperture 74 and the second attachment plate aperture 58 is substantially the same size and shape as the second top plate aperture 76. The first attachment plate aperture 56 passes completely through the top flange 52 of the attachment plate 48 proximate to the first side flange 22, and the second attachment plate aperture 58 passes completely through the top flange 52 of the attachment plate 48 proximate to the second side flange 28, such that the first attachment plate aperture 56 is aligned directly below the first top plate aperture 74 and the second attachment plate aperture 58 is aligned directly below the second top plate aperture 76.

Formed into the upper flange 90 of the front plate 84 of the bumper component 4 are a first upper flange aperture 94 and a second upper flange aperture 95. The first upper flange aperture 94 is substantially the same size and shape as the first top plate aperture 74 and the second upper flange aperture 95 is substantially the same size and shape as the second top plate aperture 76. The first upper flange aperture 94 passes completely through the upper flange 90 of the front plate 84 proximate to the first edge 86 of the front plate 84, and the second upper flange aperture 95 passing through the upper flange 90 of the front plate 84 proximate to the second edge 88 of the front plate 84, such that the first upper flange aperture 94 is aligned directly below the first top plate aperture 74 and the second upper flange aperture 95 is aligned directly below the second top plate aperture 76 when the front plate 84 is positioned vertically within the cavity of the mount component 2.

Formed into the lower flange 96 of the front plate 84 of the bumper component 4 are a first lower flange aperture 100 and a second lower flange aperture 101. The first lower flange aperture 100 is substantially the same size and shape as the first top plate aperture 74 and the second lower flange aperture 101 is substantially the same size and shape as the second top plate aperture 76. The first lower flange aperture 100 passes completely through the lower flange 96 of the front plate 84 proximate to the first edge 86 of the front plate 84, and the second lower flange aperture 101 passes completely through the lower flange 96 of the front plate 84 proximate to the second edge 88 of the front plate 84, such that the first lower flange aperture 100 is aligned directly below the first top plate aperture 74 and the first upper flange aperture 94, and the second upper flange aperture 95 is aligned directly below the second top plate aperture 76 and the second upper flange aperture 95, when the front plate 84 is positioned vertically within the cavity of the mount component 2.

To complete the assembly of the dock bumper device 1, the front plate 84 is positioned vertically within the cavity of the mount component 2 and against the back plate 15, such that the upper flange 90 of the front plate 84 contacts the front surface 44 of the back panel 34 and the lower flange 96 of the front plate 84 contacts the front surface 44 of the back panel 34. In this configuration the front panel 102 is positioned between the first side flange 22 and the second side flange 28 and the front panel 102 is oriented substantially parallel to the back panel 34. In this configuration the first top plate aperture 74 is aligned with the first upper flange aperture 94 and with the first lower flange aperture 100 and with the first attachment plate aperture 56, and the second top plate aperture 76 is aligned with the second upper flange aperture 95 and with the second lower flange aperture 101 and with the second attachment plate aperture 58. The first slide pin 122 is positioned through the first top plate aperture 74, first upper flange aperture 94, first lower flange aperture 100, and first attachment plate aperture 56 such that the first top cap 132 rests on the top plate 62 and the threaded bottom end 130 of the first slide pin 122 extends below the top flange 52 of the attachment plate 48. The second slide pin 136 is positioned through the second top plate aperture 76, second upper flange aperture 95, second lower flange aperture 101, and second attachment plate aperture 58 such that the second top cap 146 rests on the top plate 62 and the threaded bottom end 144 of the second slide pin 136 extends below the top flange 52 of the attachment plate 48. The first spring 150 is disposed over the first slide pin 122 and positioned between the lower flange 96 of the front plate 84 and the top flange 52 of the attachment plate 48. The second spring 158 is disposed over the second slide pin 136 and positioned between the lower flange 96 of the front plate 84 and the top flange 52 of the attachment plate 48. Finally, the first nut 166 is placed onto the threaded bottom end 130 of the first slide pin 122, thereby securing the first slide pin 122 to the top flange 52 of the attachment plate 48, and the second nut 168 is placed onto the threaded bottom end 144 of the second slide pin 136, thereby securing the second slide pin 136 to the top flange 52 of the attachment plate 48.

Assembled as such, movement of the bumper component 4 in a downward direction compresses the first spring 150 and the second spring 158, and movement of the bumper component 4 in an upward direction releases the first spring 150 and the second spring 158. If no force is applied to move the bumper component 4 (or to prevent such movement), the first spring 150 and the second spring 158 will together tend to move the bumper component 4 in an upward direction. The use of two springs 150,158 disposed over two slide pins 124,136 disperses the lateral forces present on the bumper component 4 and minimizes the likelihood of the bumper component 4 binding on one or both of the slide pins 124,136.

The dock bumper device 1 is mounted to a loading dock 8 as follows: the mount component 2 is oriented vertically and placed against the loading dock 8 and fixedly attached thereto. The back surface 46 of the back panel 34 and the back flange 54 of the attachment plate 48 are positioned such that they are adjacent to the vertical front wall 10 of the loading dock 8. The lip 68 of the top plate 62 is positioned such that it is adjacent to the upper surface 12 of the loading dock 8, thereby bearing a substantial portion of the weight of the device 1.

In one embodiment, the lip 68 of the top plate 62 is welded to the upper surface 12 of the loading dock 8, and the back flange 54 of the attachment plate 48 is welded to the vertical front wall 10 of the loading dock 8. In another embodiment, a plurality of top apertures 78 are dispersed along the lip 68 of the top plate 62, passing completely through the lip 68, and a plurality of side apertures 60 are dispersed along the back flange 54 of the attachment plate 48, passing completely through the back flange 54. In this embodiment, a plurality of bolts 80 suitably adapted to pass through the top apertures 78 and the side apertures 60 and into the loading dock 8 are used to fixedly attach the mounting component to the loading dock 8. Anchor sleeves 82 may be used to further secure the bolts 80 into the loading dock 8.

Among the advantages of the disclosed invention are the following. The inherent rigidity and strength of the metal components 2,4,6 of the dock bumper device 1 provide excellent durability and minimize the need for maintenance. The simple design makes the device 1 inexpensive to manufacture and adaptable to many different loading dock 8 configurations. The dual slide pin 124,136 configuration ensures smooth movement with a minimum of binding due to lateral forces. The vertical movement of the bumper 14 in concert with the vehicle 9 virtually eliminates any destructive rubbing of the bumper 14, thereby solving the problem of bumpers 14 being damaged or torn off loading docks 8 by the movement of vehicles 9 during loading and unloading.

The disclosed invention is not limited to what is described in the foregoing embodiments. Those skilled in the art will be able to contemplate variations consistent with the spirit of the invention. Other embodiments not specifically set forth herein are also within the scope of the following claims.

I claim:
1. A dock bumper device, comprising
a bumper component;
a slide component; and
a mount component;
wherein the bumper component is suitably adapted to accommodate a bumper;
the slide component is suitably adapted to connect the bumper component to the mount component in a manner permitting the bumper component to move along the mount component in a vertical direction; and
the mount component comprises
a back plate, having a back panel, a first side flange, a second side flange, a top edge, and a bottom edge,
wherein the back panel is substantially flat, is substantially rectangular with a width less than its height, has a first side and a second side, and has a front surface and a back surface,
the first side flange is substantially rectangular with a length substantially the same as the height of the back panel and a width substantially less than the length of the first side flange, is integrated with the back panel along the first side of the back panel, and is oriented substantially perpendicular to the back panel extending from the front surface of the back panel, and
the second side flange is substantially rectangular with a length substantially the same as the height of the back panel and a width substantially less than the length of the second side flange, is integrated with the back panel along the second side of the back panel, is oriented substantially perpendicular to the back panel extending from the front surface of the back panel, and is substantially parallel to the first side flange;
an attachment plate, having a length substantially equivalent to the width of the back plate and comprised of a top flange and a back flange oriented substantially perpendicular to each other; and
a top plate, being substantially flat, substantially rectangular with a width substantially the same as the width of the back plate, and having a front edge, a first edge, and a second edge;
whereby the top flange of the attachment plate is fixedly attached to the bottom edge of the back plate and oriented substantially perpendicular to the back panel and extending forward from the front surface of the back panel, the back flange of the attachment plate is oriented substantially coplanar with the back panel, the top plate is fixedly attached to the top edge of the back plate and oriented substantially perpendicular to the back panel, with the first edge of the top plate aligned with the first side flange and the second edge of the top plate aligned with the second side flange, and with the front edge of the top plate oriented forward of the front surface of the back panel and the top plate extending rearward from the back surface of the back panel, thereby forming a lip, and the mount component is fixedly attached to the loading dock such that the back surface of the back panel and the back flange of the attachment plate are adjacent to a vertical front wall of the loading dock and the lip of the top plate is adjacent to an upper surface of the loading dock.

2. The device of claim 1, wherein the back plate is constructed of channel iron, the attachment plate is constructed of angle iron, and the top plate is constructed of material selected from the group comprising plate steel and steel bar stock.

3. The device of claim 1 wherein the lip of the top plate is welded to the upper surface of the loading dock and the back flange of the attachment plate is welded to the vertical front wall of the loading dock.

4. The device of claim 1 wherein the mount component further comprises a plurality of top apertures dispersed along and passing through the lip of the top plate;

a plurality of side apertures dispersed along and passing through the back flange of the attachment plate; and a plurality of bolts suitably adapted to pass through the top apertures and the side apertures;

whereby the mount component is fixedly attached to the loading dock by passing the bolts through the top apertures and into the upper surface of the loading dock and passing the bolts through the side apertures and into the vertical front wall of the loading dock.

5. The device of claim 4 wherein the mount component further comprises a plurality of anchor sleeves suitably adapted to be integrated into the loading dock and suitably adapted to accommodate the bolts.

6. The device of claim 1, wherein the bumper component comprises a front plate, having a front panel, an upper flange, a lower flange, a first edge, and a second edge,
   wherein the front panel is substantially flat, is substantially rectangular with a width slightly less than the width of the back panel and a height less than the height of the back plate, has a top side and a bottom side, and has a front surface and a back surface,
   the upper flange is substantially rectangular with a length substantially the same as the width of the front panel and a width substantially less than the length of the upper flange, is integrated with the front panel along the top side of the front panel, and is oriented substantially perpendicular to the front panel extending rearward from the back surface of the front panel, and
   the lower flange is substantially rectangular with a length substantially the same as the width of the front panel and a width substantially less, than the length of the lower flange, is integrated with the front panel along the bottom side of the front panel, is oriented substantially perpendicular to the front panel extending rearward from the back surface of the front panel, and is substantially parallel to the upper flange; and a bumper suitably adapted to receive and dissipate a force from an object striking the bumper, whereby the bumper is fixedly attached to the front surface of the front panel.

7. The device of claim 6, wherein the front plate is constructed of standard double thickness channel iron.

8. The device of claim 6 wherein the front plate is reinforced with one or more reinforcement bars constructed of a rigid metal material and welded to the back surface of the front panel.

9. The device of claim 6 wherein the front panel further comprises a plurality of apertures dispersed along the front panel and suitably adapted to accommodate a plurality of fastening devices suitably adapted to attach the bumper to the front panel.

10. The device of claim 6, wherein the slide component comprises a first slide pin, being a rod having a circular cross section, having a uniform diameter and a length slightly greater than the height of the back plate, and having a top end and a threaded bottom end;

a second slide pin, being a rod having a circular cross section, having a uniform diameter substantially the same as the diameter of the first slide pin and being of substantially the same length as the first slide pin, and having a top end and a threaded bottom end;

a first top cap, being substantially flat, substantially circular, having a diameter greater than the diameter of the first slide pin, and being fixedly attached to and oriented perpendicular to the top end of the first slide pin;

a second top cap, being substantially flat, substantially circular, having a diameter greater than the diameter of the second slide pin, and being fixedly attached to and oriented perpendicular to the top end of the second slide pin;

a first spring, coiled such that it has a substantially uniform outside diameter and a substantially uniform inside diameter with the inside diameter slightly greater than the diameter of the first slide rod, with the first spring having a length less than the length of the first slide pin, and with the first spring suitably adapted to support the weight of the bumper component;

a second spring, coiled such that it has a substantially uniform outside diameter and a substantially uniform inside diameter with the inside diameter slightly greater than the diameter of the second slide rod, with the second spring having a length less than the length of the second slide pin, and with the second spring suitably adapted to support the weight of the bumper component;

a first nut, suitably adapted to be placed onto and secured to the threaded bottom end of the first slide pin;

a second nut, suitably adapted to be placed onto and secured to the threaded bottom end of the second slide pin;

a first top plate aperture and a second top plate aperture, each being substantially circular, with the first top plate aperture having a diameter just slightly larger than the diameter of the first slide pin and just slightly smaller than the outside diameter of the first spring and the second top plate aperture having a diameter just slightly larger than the diameter of the second slide pin and just slightly smaller than the outside diameter of the second spring, with the first top plate aperture passing through the top plate proximate to the front edge of the top plate and proximate to the first side flange, and with the second top plate aperture passing through the top plate proximate to and equidistant from the front edge of the top plate and proximate to and equidistant from the second side flange;

a first upper flange aperture and a second upper flange aperture, the first upper flange aperture being substantially the same size and shape as the first top plate aperture and the second upper flange aperture being substantially the same size and shape as the second top plate aperture, with the first upper flange aperture passing through the upper flange of the front plate proximate to the first edge of the front plate, and with the second upper flange aperture passing through the upper flange of the front plate proximate to and equidistant from the second edge of the front plate;

a first lower flange aperture and a second lower flange aperture, the first lower flange aperture being substantially the same size and shape as the first top plate aperture and the second lower flange aperture being substantially the same size and shape as the second top plate aperture, with the first lower flange aperture passing through the lower flange of the front plate proximate to the first edge of the front plate, and with the second lower flange aperture passing through the lower flange of the front plate proximate to and equidistant from the second edge of the front plate; and a first attachment plate aperture and a second attachment plate aperture, the first attachment plate aperture being substantially the same size and shape as the first top plate aperture and the second attachment plate aperture being substantially the same size and shape as the second top plate aperture, with the first attachment plate aperture passing through the top flange of the attachment plate proximate to the first side flange, and with the second attachment plate aperture passing through the top flange of the attachment plate proximate to and equidistant from the second side flange;

whereby the front plate is positioned against the back plate such that the upper flange of the front plate contacts the front surface of the back panel and the lower flange of the front plate contacts the front surface of the back panel and the front panel is positioned between the first side flange and the second side flange and the front panel is substantially parallel to the back panel, and the first top plate aperture is aligned with the first upper flange aperture and with the first lower flange aperture and with the first attachment plate aperture, and the second top plate aperture is aligned with the second upper flange aperture and with the second lower flange aperture and with the second attachment plate aperture, the first slide pin is positioned through the first top plate aperture, first upper flange aperture, first lower flange aperture, and first attachment plate aperture such that the first top cap rests on the top plate and the threaded bottom end of the first slide pin extends below the top flange of the attachment plate, the second slide pin is positioned through the second top plate aperture, second upper flange aperture, second lower flange aperture, and second attachment plate aperture such that the second top cap rests on the top plate and the threaded bottom end of the second slide pin extends below the top flange of the attachment plate, the first spring is disposed over the first slide pin and positioned between the lower flange of the front plate and the top flange of the attachment plate, the second spring is disposed over the second slide pin and positioned between the lower flange of the front plate and the top flange of the attachment plate, the first nut is placed onto the threaded bottom end of the first slide pin thereby securing the first slide pin to the top flange of the attachment plate, and the second nut is placed onto the threaded bottom end of the second slide pin thereby securing the second slide pin to the top flange of the attachment plate.

* * * * *